(12) United States Patent
Suzuki et al.

(10) Patent No.: US 7,839,999 B2
(45) Date of Patent: Nov. 23, 2010

(54) ENCRYPTION DEVICE, ENCRYPTION PROCESSING METHOD AND PROGRAM, AND INFORMATION PROTECTION SYSTEM EMPLOYING THE ENCRYPTION DEVICE

(75) Inventors: Koji Suzuki, Kanagawa (JP); Makoto Hirose, Kanagawa (JP); Naoki Hayashi, Kanagawa (JP); Atsuhito Monma, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1529 days.

(21) Appl. No.: 11/077,118

(22) Filed: Mar. 11, 2005

(65) Prior Publication Data
US 2006/0120520 A1 Jun. 8, 2006

(30) Foreign Application Priority Data
Sep. 24, 2004 (JP) .............................. 2004-278540

(51) Int. Cl.
G06F 7/04 (2006.01)
G06F 17/30 (2006.01)
H04N 7/16 (2006.01)
H04L 29/06 (2006.01)
H04L 9/00 (2006.01)
B41K 3/38 (2006.01)
H04K 1/00 (2006.01)

(52) U.S. Cl. .............................. 380/28; 726/2; 726/26; 713/166; 380/255; 380/44; 380/59

(58) Field of Classification Search ................ 726/2–4, 726/16, 17, 21, 26, 27, 30; 713/150, 153, 713/155, 168; 380/28, 44, 59, 277–279, 380/283, 285, 286
See application file for complete search history.

(56) References Cited

U.S. PATENT DOCUMENTS

| 6,931,532 B1 * | 8/2005 | Davis et al. | ................. 713/167 |
| 2002/0087479 A1 * | 7/2002 | Malcolm | ..................... 705/64 |
| 2002/0188845 A1 | 12/2002 | Henderson et al. | |
| 2004/0190714 A1 * | 9/2004 | Masui et al. | ................. 380/43 |

FOREIGN PATENT DOCUMENTS

| EP | 0 518 466 A1 | 12/1992 |
| JP | 8006784 A | 1/1996 |

(Continued)

OTHER PUBLICATIONS

"Minimal Key Lengths for Symmetric Ciphers to Provide Adequate Commercial Security," Blaze et al., A Report by an Ad Hoc Group of Cryptographers and Computer Scientists, Jan. 1996.*

(Continued)

Primary Examiner—Nasser Moazzami
Assistant Examiner—Oscar A Louie
(74) Attorney, Agent, or Firm—Sughrue Mion, PLLC

(57) ABSTRACT

An encryption device includes a first unit that acquires value information denoting a value of information to be encrypted, and a second unit that calculates a strength parameter denoting an encryption strength, based on the value information. It is thus possible to determine the strength parameter reasonably according to the information to be encrypted.

27 Claims, 5 Drawing Sheets

FOREIGN PATENT DOCUMENTS

| JP | 10-164051 A | 6/1998 |
| JP | 2003-78751 A | 3/2003 |
| JP | 2003173258 A | 6/2003 |
| JP | 2004526389 T | 8/2004 |

OTHER PUBLICATIONS

"The RC5 Encryption Algorithm," Rivest, MIT Laboratory for Computer Science, Mar. 20, 1997.*

"Tamper Resistant Technology"; Tamper Resistant Technology of Software; Jun. 2003 issue of Information Processing.

Simon Hunter et al.; "Approximating The Number of Integers Free of Large Prime Factors"; American Mathematical Society; vol. 66; No. 220; Oct. 1997; pp. 1729-1741.

Koji Suzuki; "An Estimate For The Number of Integers Without Large Prime Factors"; American Mathematical Society; vol. 73; No. 246; pp. 1013-1022.

Simson Garfinkel; "PGP: Pretty Good Privacy"; The Mathematics of Cryptography; pp. 358-367.

J.P. Buhler; "Factoring Integers With The Number Field Sieve"; pp. 50-94.

Adolf Hildebrand et al.; "On Integers Free of Large Prime Factors"; Transactions of the American Mathematical Society; vol. 296; No. 1; Jul. 1986; pp. 265-290.

Lorraine C. Williams, "A Discussion of the Importance of Key Length in Symmetric and Asymmetric Crytography", SANS Institute, 2002, pp. 1-10.

Arjen K. Lenstra, et al., "Selecting Cryptographic Key Sizes", Lecture Notes in Computer Science, 2000, pp. 446-465, vol. 1751.

Japanese Office Action dated Aug. 17, 2010, issued in Japanese Patent Application No. 2004-278540.

* cited by examiner

ENCRYPTION DEVICE, ENCRYPTION PROCESSING METHOD AND PROGRAM, AND INFORMATION PROTECTION SYSTEM EMPLOYING THE ENCRYPTION DEVICE

BACKGROUND OF THE INVENTION

1. Field of the Invention

This invention relates to encryption devices that determine encryption strengths when information is encrypted, encryption methods and programs, and information protection systems that employ the encryption devices.

2. Description of the Related Art

Generally, the encryption strength for protecting contents (information) is predetermined by the scale of the system or a company's security policy. The encryption strength is shown as a length of key used for the encryption or the like. For example, Internet Explorer® 4.x International of Microsoft employs three lengths (strengths) of RSA (Rivest-Samir-Adleman) keys, 512, 768, and 1024 bits, as public key cryptosystem. The user is able to select one of the above-mentioned keys based on the scale of the system or the security polity to encrypt and protect the content.

Conventionally, the content delivery system has been proposed in, for example, Japanese Patent Application Publication No. 2003-78751. This conventional content delivery system stores protection policy information in a database of a content delivery server in association with each content. The protection policy information denotes conditions in protection, which is determined according to the protection strength required by the owner of the content. When the content delivery server receives a content delivery request from a client terminal, the content delivery server encrypts the content with the use of the protection policy information stored in the database in association with the requested content, and then delivers the encrypted content to the client terminal over the network.

With the above-mentioned system, the protection (encryption) is applied to each content, according to the protection strength required by the owner of the content. The content protection is not standardized in every content. The content protection becomes possible according to the owner's requirement.

According to the above-mentioned conventional system, however, it is not proposed how the owner of the content decides the protection strength of the content thereof, that is to say, how the protection policy is applied to every content. In the case where the information on the key used for the encryption is included in the protection policy information, an appropriate length of the key is selected from the limited number of the keys, for example, three keys, according to the above-mentioned common method.

With the conventional system described above, the protection strength of information (contents), namely, the encryption strength, is decided by the owner of the content or someone else subjectively. The decided protection strength (encryption strength) is not always reasonable or practicable for the information or the users who use the information. For instance, in the case where the information on a number of customers (customer information) is encrypted, it is not necessarily reasonable to set the same encryption strength in the server, which stores all the information of a number of customers and in a terminal such as PDA or the like, on which a small portion of the customer information is used, in view of the performances of the server and the PDA.

SUMMARY OF THE INVENTION

The present invention has been made in view of the above circumstances and provides an encryption device, with which the encryption strength can be determined reasonably when the information is encrypted, an encryption method and program, an information protection system employing the encryption device.

According to an aspect of the present invention, preferably, there is provided an encryption device including a first unit that acquires value information denoting a value of information to be encrypted, and a second unit that calculates a strength parameter denoting an encryption strength when the information is encrypted, based on the value information.

According to an aspect of the present invention, preferably, there is provided an encryption method including acquiring value information denoting a value of information to be encrypted, and calculating a strength parameter denoting an encryption strength when the information is encrypted, based on the value information.

According to an aspect of the present invention, preferably, there is provided a storage medium readable by a computer to perform a program for encryption, the program including acquiring value information denoting a value of information to be encrypted, and calculating a strength parameter denoting an encryption strength when the information is encrypted, based on the value information. It is possible to obtain the strength parameter denoting the encryption strength according to the value of the information to be encrypted, by executing the above-mentioned program on the processing unit (computer).

According to an aspect of the present invention, preferably, there is provided an information protection system including an encryption device, and a content encryption processing unit that encrypts information with an encryption strength denoted by a strength parameter obtained by the encryption device. The encryption device includes a first unit that acquires value information denoting a value of information to be encrypted and a second unit that calculates the strength parameter denoting the encryption strength when the information is encrypted, based on the value information.

According to an aspect of the present invention, preferably, there is provided an information protection method including preparing a method based on Moore's Law and an accurate estimate value of a calculation amount necessary for factorization into prime factors, and calculating an appropriate key length with a value of information to be protected and the calculation amount necessary for decryption.

With the above-mentioned configuration, the strength parameter denoting the encryption strength is obtained according to the value of the information to be encrypted. Specifically, it is possible to set the encryption strength stronger as the value of the information becomes higher. It is possible to encrypt the information with thus determined encryption strength. The above-mentioned encryption device may include a single or multiple processing units such as server and a program to be executed on the processing unit. The above-mentioned first unit that acquires value information may obtain the value information from an external device or the first unit may calculate any type of information provided from the external device. In addition, it is possible to reduce the amount of calculation for the encryption process, which is a burden for the user, by optimizing the key length.

BRIEF DESCRIPTION OF THE DRAWINGS

Embodiments of the present invention will be described in detail based on the following figures, wherein.

DESCRIPTION OF THE EMBODIMENTS

Figure 1:
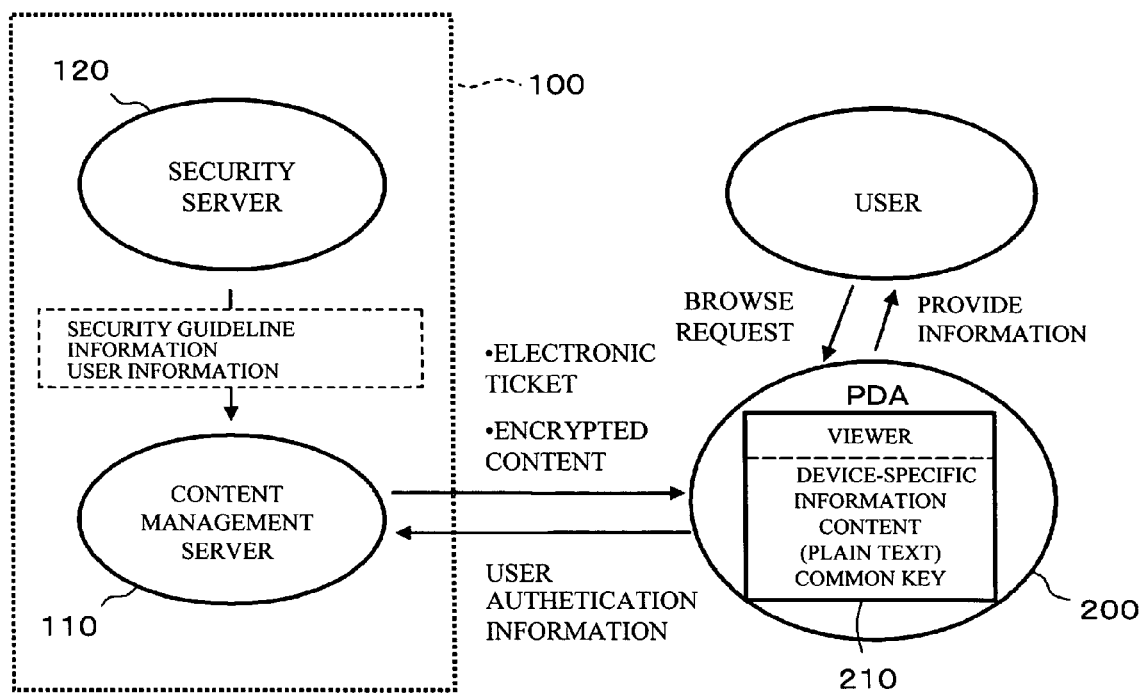
FIG. 1 is a block diagram illustrating an encryption system in accordance with an embodiment of the present invention.

FIG. 1 shows an encryption system in accordance with an embodiment of the present invention.

As shown in the figure, a content protection system 100 includes a content management server 110 and a security server 120. The content management server 110 and the security server 120 are connected over, for example, an in-house LAN. The content management server 110 stores the customer information of a large number of customers in a disk device. The customer information includes records (hereinafter referred to as customer record), each of which is a data unit corresponding to each customer. If this customer information is leaked on the network, the company might lose its confidence in society. In addition, there is a concern that the company has to pay a large amount of money in compensation. For this reason, the whole customer information is encrypted with the 2048-bit RSA key so as to protect the customer information with the highest level of protection strength.

The security server 120 manages the information on the users who are allowed to access the customer information managed by the content management server 110. The security server 120 provides the content management server 110 with the user information and security guideline information based on the request from the content management server 110. The user information includes user qualification information, which is necessary for identifying a user's available scope of the customer information. The security guideline information includes an estimated unit price or the like of each customer record, which is used for determining an estimate value of a file including the customer information.

A PDA (Personal Digital Assistant) 200 is capable of accessing the content management server 100 via the in-house LAN. The PDA 200 is used by, for example, an employee of the company which manages the content management system 100. The PDA 200 includes user authentication capabilities, decryption capabilities that decrypt the encrypted file into a plain text, and software tamper-resistant capabilities (refer to "Tamper-resistant technology of software" June, 2003 issue of Information Processing). The software tamper-resistant capabilities prevent the leakage of the decrypted file to be decrypted to the plain text, the encryption keys, and the like. The PDA 200 includes a viewer 210 protected by the tamper-resistant capabilities to show (display) the decrypted file to the user.

Figure 2:
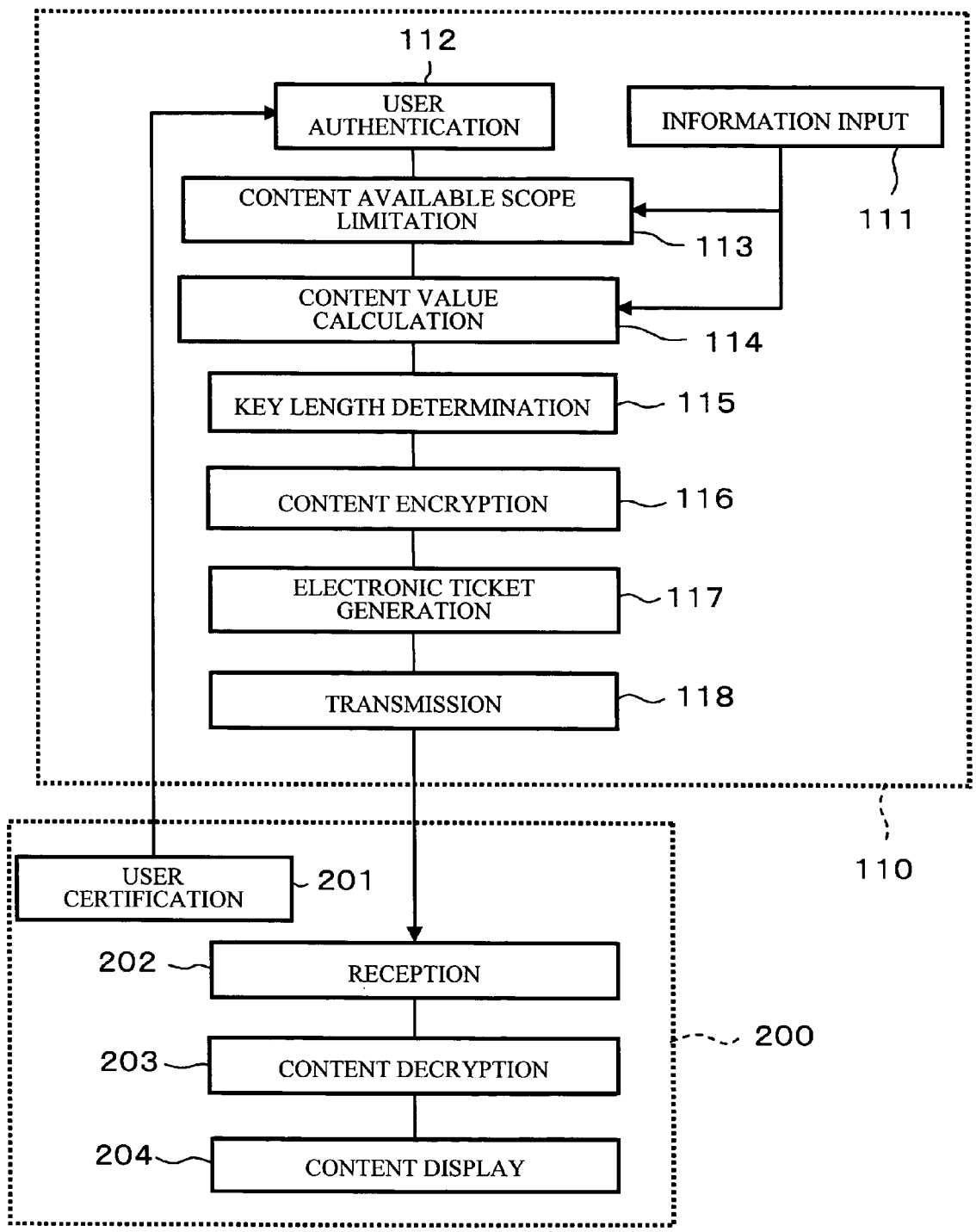
FIG. 2 shows functional configurations of a PDA and a content management server.

FIG. 2 shows configurations of the content management server 110 and the PDA 200.

As shown in FIG. 2, the content management server 110 includes an information input processing unit 111, a user authentication processing unit 112, a content available scope limitation processing unit 113, a content value calculation processing unit 114, a key length determination processing unit 115, a content encryption processing unit 116, an electronic ticket generation processing unit 117, and a transmission processing unit 118. The information input processing unit 111 acquires the security guideline information and the user information from the security server 120.

The user authentication processing unit 112 performs user authentication, based on the information that certifies the user such as employee information, which is transmitted from the PDA 200 used by the user. The content available scope limitation processing unit 113 sets up a limitation to use the customer information, based on the user qualification information included in the user information acquired by the information input processing unit 111 from the security server 120. The content available scope limitation processing unit 113 generates a file which contains the customer records included in the available scope of the limited customer information.

The content value calculation processing unit 114 calculates the value of the customer information, based on the number of the customer records included in the file acquired by the content available scope limitation processing unit 113 and the estimated unit price of each customer record included in the security guideline information, which is acquired by the information input processing unit 111 from the security server 120. Specifically, the content value calculation processing unit 114 calculates the value of the file of the customer records, which is acquired by the content available scope limitation processing unit 113.

The key length determination processing unit 115 calculates a strength parameter showing the encryption strength for the customer information used by the user is encrypte, based on the value information indicating the value of the customer information acquired by the content value calculation processing unit 114. Specifically, the key length determination processing unit 115 calculates the key length used for the encryption process (for example, the number of bits). The content encryption processing unit 116 encrypts the file of the customer records acquired by the content available scope limitation processing unit 113, with an encryption algorithm based on the key length acquired by the key length determination processing unit 115.

The encryption device in accordance with the present invention includes for example, the information input processing unit 111, the content available scope limitation processing unit 113, the content value calculation processing unit 114, the key length determination processing unit 115, and the content encryption processing unit 116. However, the present invention is not limited to such an example.

A program protected by the tamper-resistant capabilities of the PDA 200 establishes a safe communication path such as VPN (Virtual Private Network) in order to communicate with the content management server 110, transmits to and registers in the information specific to the PDA 200 (hereinafter referred to as device-specific information) to the content management server 110 in advance. The program may be readable by a computer storing the program. The electronic ticket generation processing unit 117 generates difference information between the device-specific information and the encryption key used for the encryption process, and outputs the difference information as an electronic ticket. The detail of the electronic ticket system is disclosed in Japanese Patent Application Publication No. 10-164051 ("User authentication device and method"). The transmission processing unit 118 performs processes to transmit the encrypted information (the encrypted file) and the electronic ticket to the PDA 200. The encrypted information is generated by the content encryption processing unit 116. The electronic ticket is generated by the electronic ticket generation processing unit 117.

The PDA 200 includes a user certification unit 201, a reception processing unit 202, a content decryption processing unit 203, and a content display processing unit 204. The user certification unit 201 sends user certificate information to the content management server 110. The user certificate information is used in the user authentication processing unit 112 of the content management server 110. The user certificate information may be, for example, the employee information, and may be input into the PDA 200 by the user or may be read by the PDA 200 from an IC card, smart card, or the like. The information that certifies the user may be an electronic certificate issued by an independent organization.

The reception processing unit 202 performs processes to receive the encrypted information (the encrypted file) and the electronic ticket sent from the content management server 110. The content decryption processing unit 203 decrypts the received electronic ticket to reproduce the encryption key, and the encrypted information is decrypted with the reproduced encryption key to generate the information of the plain text (file). Thus reproduced encryption key (common key) and the information of plain text (file) are protected by the tamper-resistant capabilities, and are retained in the PDA 200 together with the device-specific information. The content display processing unit 204 corresponds to capabilities of the viewer 210, and displays the information of the plain text (file) which is protected by the tamper-resistance capabilities on a display unit.

All the processing units 111 through 118 in the content management server 110 shown in FIG. 2 are realized with hardware (CPU or the like) and programs. In the same manner, all the processing units 201 through 204 in the PDA 200 are realized with hardware (CPU or the like) and programs.

Figure 3:
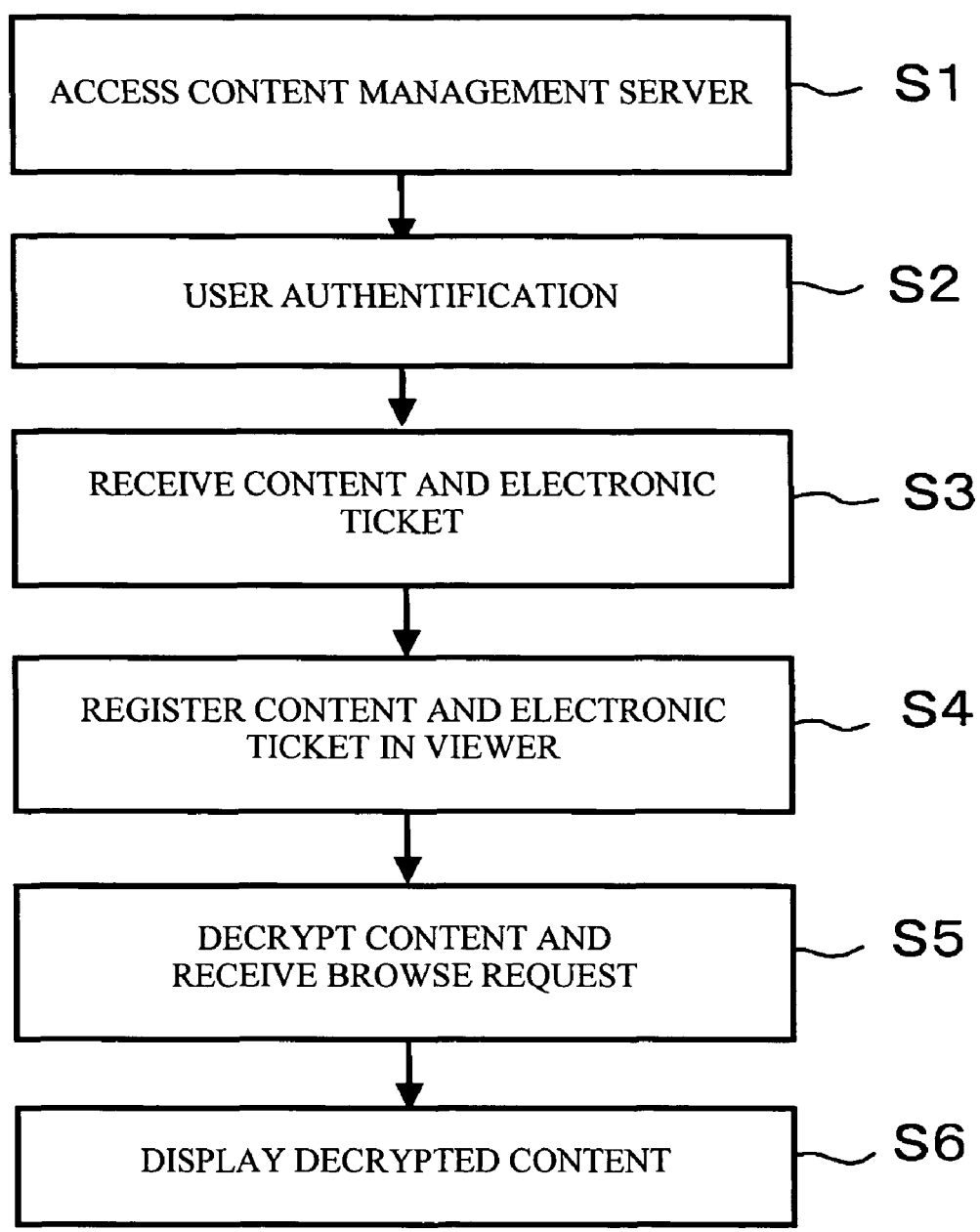
FIG. 3 is a flowchart describing a process procedure of the PDA.
Figure 4:
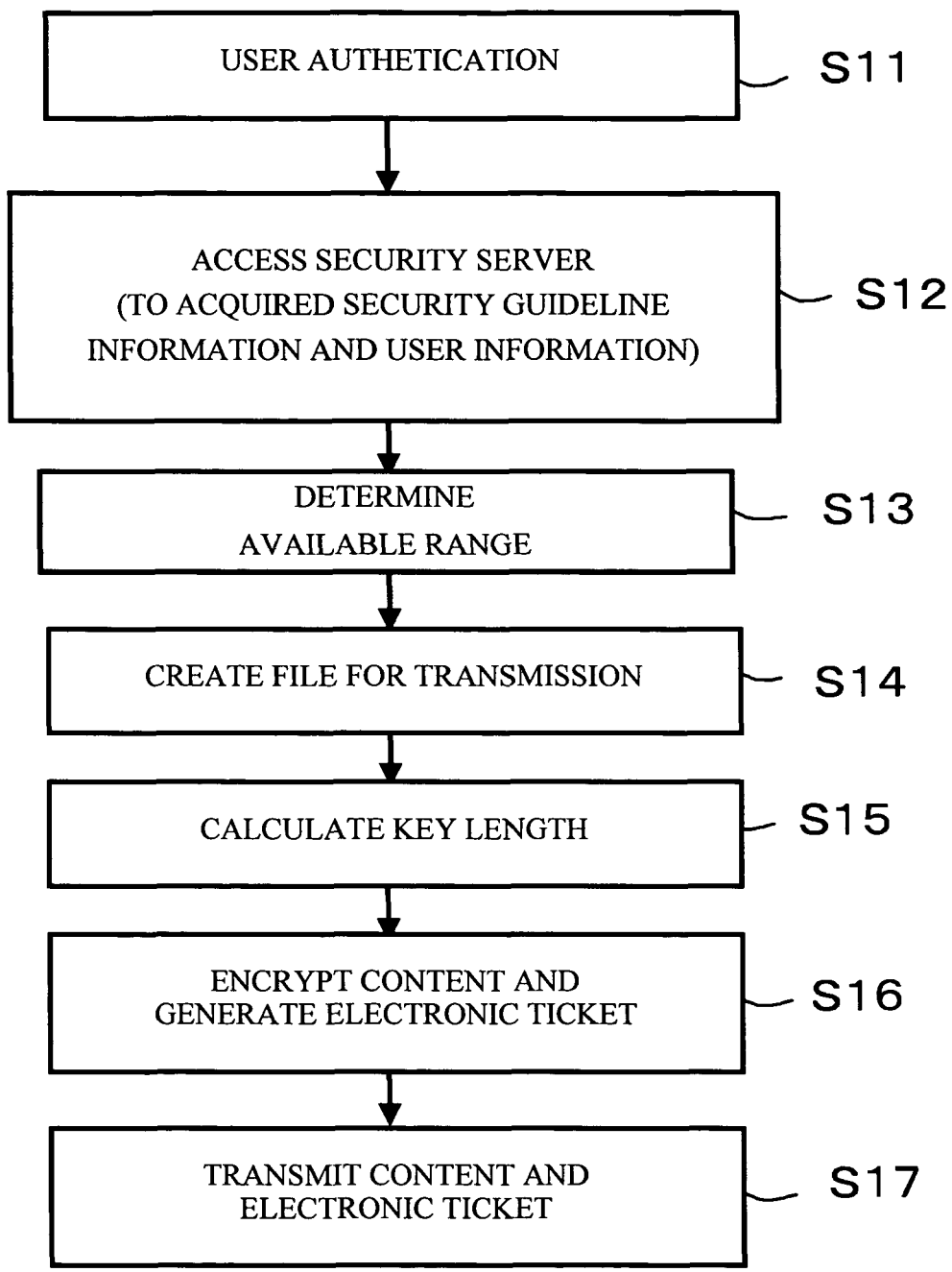
FIG. 4 is a flowchart describing a process procedure of the content management server.

FIG. 3 is a flowchart describing a procedure of the PDA 200. FIG. 4 is a flowchart describing a procedure of the content management server 110.

As shown in FIG. 3, when the user performs an operation on the PDA 200 to obtain the customer information, the PDA 200 accesses the content management server 110 (S1). When the communication path is established between the PDA 200 and the content management server 110, the PDA 200 transmits the user certificate information to the content management server 110 for the user authentication (S2). The content management server 110 receives the user certificate information, and performs the processes according to the procedure shown in FIG. 4.

As shown in FIG. 4, the content management server 110 (the user authentication processing unit 112) performs the authentication process of the user based on the user certificate information (S11). The user is certified to be an allowable user to access the customer information with the authentication process, and the content management server 110 (the information input processing unit 111) accesses the security server 120 to send the user certificate information and ask a request for the security guideline information of the user (S12). The security server 120 responds to the request, and sends the user information and the security guideline information to the management server 110. The user information includes the user qualification information necessary for identifying the user's available scope of the customer information. The user is certified by the certification information. The security guideline information includes the estimate unit price or the like of each customer record, which is used for determining the estimated value of the file. The estimate unit price will be described later in detail.

The content management server 110 (the content available scope limitation processing unit 113) receives the user information and the security guideline information from the security server 120 (the information input processing unit 111), the content management server 110 (the content available scope limitation processing unit 113) determines the customer record within the user's available scope, from the customer information stored and managed in the disk device, based on the user qualification information included in the user information (S13). The available scope of the customer information may be determined by official responsibilities of the user (employee) or the like.

The user's available scope of the customer information is determined as described, the content management server 110 decrypts the encrypted customer information with, for example, the 2048-bit key used for the encryption, and generates a transmission file of the customer record within the scope determined from the file of the customer information obtained by the decryption (S14). The content management server 110 calculates the key length for encrypting the transmission file (S15). The key length is calculated by the following two steps.

In the first step, namely, the process in the content value calculation processing unit 114, the value of the customer record (information), which is included in the generated transmission file, is calculated as described. Specifically, a value T, which is an estimate price of the transmission file, is calculated as follows, based on a number of the customer records M included in the transmission file and an estimate unit price V of each customer record included in the security guideline information.

$$T = V \cdot M \quad (1)$$

The estimate unit price V of the customer record may be determined based on, for example, the compensation payment for one customer's information, which was judged by a customer information leakage trial in the past.

In the second step, namely, the process in the key length determination processing unit 115, the key length is calculated for encrypting the transmission file, based on the value of the customer records for M persons included in the transmission file. Specifically, a minimum value of the key length is calculated to satisfy a condition that a cost, which is required for decrypting or decoding the encrypted information or data maliciously or without authorization, is equal to or more than the value T. If the key length is determined in this manner, the cost required for decrypting or decoding the encrypted information or data maliciously or without authorization, with the key length, will be higher than the value of the information. It is thus possible to make malicious users consider that the decrypting or decoding the encrypted information or data maliciously or without authorization does not have an economic advantage any longer. In addition, the minimum value of the key length that satisfies the above-mentioned condition is determined as the key length used for the actual encryption. It is thus possible to suppress the amount of process to decrypt the encrypted information as much as possible. A description will be given of how the key length is calculated in detail.

A unit price estimation calculation amount f (Y), which is an estimate value of the calculation amount, is calculated based on a protection period Y of the customer information and a computational power F performed during the protection period Y, according to a method based on the Moore's Law, for example, Rivest's method. The Moore's Law denotes a relationship in time between the price and the performance of the processing device. The computational power F for a price (for example, 1 yen) is included in the security guideline information, and is determined based on the price and the performance of the processing device (composed of a CPU and a mother board) that can decrypt the encrypted information. With this method, assuming that the total sales price of a 1 GHz CPU and a mother board is, for example, 30,000 yen, the unit price estimation calculation amount f(Y), which is an estimate value of calculation for the price (1 yen) during the protection period Y, is calculated according to $$f(Y)=F \cdot (2^{\wedge}(Y/1.5)) \quad (2)$$

In the above expression, "^" denotes a power method (hereinafter "^" denotes the power method).

Next, a key length K (bit) is calculated, with the unit price estimation calculation amount f(Y) denoted in the expression (2), the value T of the customer records of M persons included in the transmission file, and an estimate formula C(n) for calculating the estimate value of the calculation amount necessary for decrypting or decoding the encrypted information or data maliciously or without authorization, according to $$K = \lg\{\min\{n | C(n) > T \cdot f(Y)\}\} \quad (3)$$

lg denotes a logarithm having a base of 2. (C(n)/f(Y)), which is the estimate formula C(n) divided by the unit price estimation calculation amount f(Y) is considered to correspond to the estimate cost required for decrypting or decoding the encrypted information or data maliciously or without authorization on the processing unit. The estimate formula C(n) denotes an estimate value of calculation amount necessary for decrypting or decoding the encrypted information or data maliciously or without authorization. The processing unit is composed of a CPU and a motherboard, which costs 30,000 yen in total. Thus, the key length K is calculated with the expression (3). The minimum value lg(n) of the key length K is calculated to satisfy the condition that the cost required for decrypting or decoding the encrypted information or data maliciously or without authorization is equal to or more than the value T.

With respect to the estimate formula C(n), $$C(n)=v(\log v), v=\min\{w|\Psi(x,y)>=xy/\log y, x=2d(n^{\wedge}(2/d))(w^{\wedge}((d+1)/2), y>0)\} \quad (4)$$

Ψ(x,y): positive integer of x or less, and the number of pieces of prime factor of x does not exceed y d: positive odd number C(n) is an expression to give a calculation amount required for factorization into prime factors, in the case where n denotes an integer number factorized into prime factors. The factorization into prime factors is generally performed in decrypting or decoding the encrypted information or data maliciously or without authorization. The estimate formula C(n) applies to an actual condition.

When the key length is calculated with the expressions (3) and (4), Ψ(x,y) denotes a positive integer of x or less, and the number of pieces of prime factor of x does not exceed y. However, it is important to calculate the estimate value with a small error and determine the key length accurately. The characteristics of Ψ(x,y) have been studied by a number of mathematicians since 1930's. However, the estimate value always includes exponential errors. The inventors of the present invention figured out a theorem, with which the estimate value of the above-mentioned Ψ(x,y) can be obtained with an error of five percent at most (Refer to (1) Math. Comp., 66, p. 1729-1741, 1997 and (2) Math. Comp., 73, p. 1013-1022, 2004).

This theorem having u and y that satisfies $u^2 \log u < y/\log y$ is denoted by, $$\Psi(x,y) = \frac{x^{\alpha} \prod_{p \leq y}(1-p^{-\alpha})^{-1}}{\alpha\sqrt{2\pi\phi_2(\alpha,y)}}\left(1+O\left(\frac{1}{\log\mu}\right)\right), \quad \phi_2(s,y) = \sum_{p \leq y}\frac{p^s(\log p)}{(p^s-1)^2}$$

$$\alpha = 1 - \frac{\xi_m}{\log y}, \quad \xi_0 = \log\mu, \quad \xi_i = \log\mu + \log(\xi_{i-1}+1/u) \quad (i>0)$$

$$m = 2 + \left[\frac{\log\mu}{\log\log\mu}\right], \quad u = \frac{\log x}{\log y}$$

Figure 5:
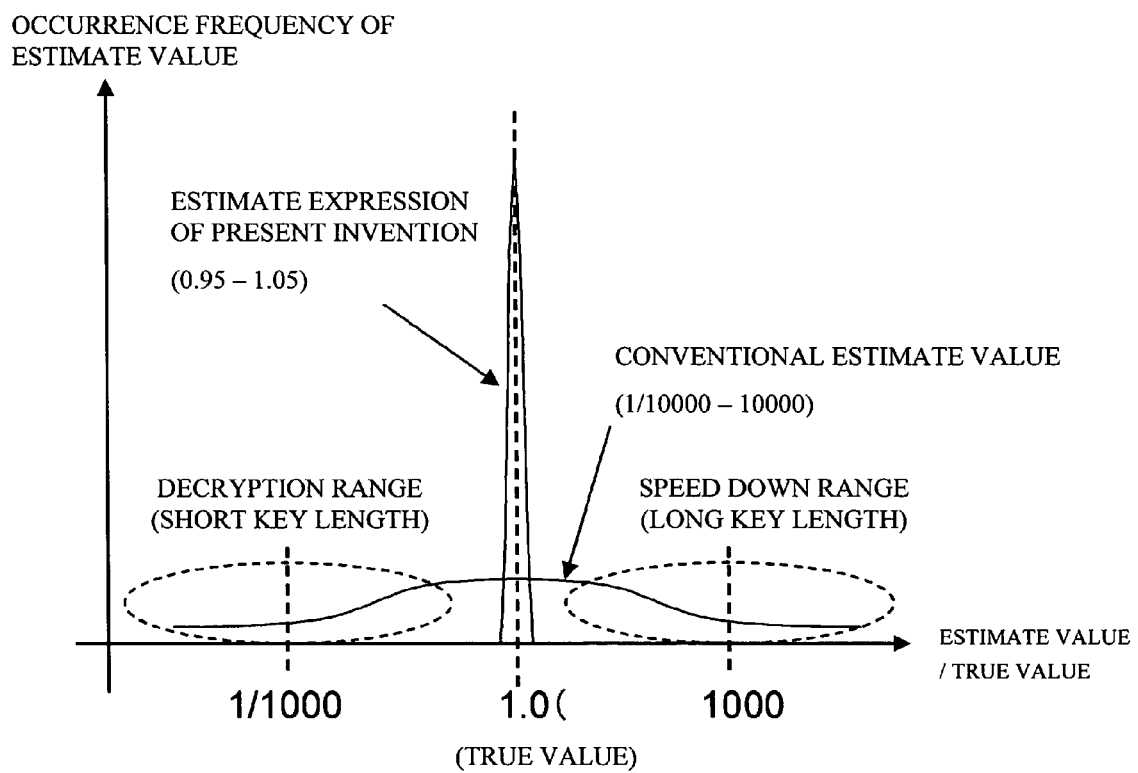
FIG. 5 illustrates effects of errors of estimate values.

Based on the above-mentioned theorem, the estimate value of Ψ(x,y) becomes dramatically accurate, as compared to the conventional decryption method in the practical usage. FIG. 5 shows the affects of errors in the estimate values of Ψ(x,y) Referring to FIG. 5, the horizontal axis denotes the estimate value divided by the true value, and the vertical axis denotes a frequency of occurrence of the estimate value. Here, the true value is set to 1.0. If the estimate value is smaller than the true value, the encrypted information or data might be encrypted or decoded maliciously or without authorization. In contrast, if the estimate value is larger than the true value, the key length becomes longer more than necessary. This speeds down. However, the estimate expression of the present invention has approximately five percent of errors only. As compared to the conventional estimate expression, the estimate expression of the present invention is significantly improved.

Referring back to FIG. 4, the key length for the encryption of the transmission file is calculated as described, and the content management server 110 encrypts the transmission file with the obtained key and generates the electronic ticket (S16) The procedure will be described as follows.

The content management server 110 (the content encryption processing unit 116) generates a random number of 160 bits, for example, sets the random number as the common key applied to the transmission file, and encrypts the transmission file with the common key. Then the common key is encrypted with the common key of the RSA method having the key length determined as described. The content management server 110 (the electronic ticket generation processing unit 117) generates, as the electronic ticket, the difference information between a secret key corresponding to the public key and the device-specific information of the PDA 200. The content management server 110 (the transmission processing unit 118) transmits the encrypted transmission file and the electronic ticket to the PDA 200 (S17).

Referring back to FIG. 3, the PDA 200 (the reception processing unit 202) receives the encrypted transmission file and the electronic ticket (S3), and registers the encrypted transmission file and the electronic ticket in the viewer 210 (S4). The viewer 210 (the content decryption processing unit 203) decrypts the encrypted transmission file (S5). In the decryption process, the secret key is decrypted based on the electronic ticket and the device-specific information, the encrypted common key is decrypted with the secret key, and the common key is decrypted. Then, the encrypted transmission file is decrypted into the plain text in the decryption process with the decrypted common key. When a manipulate signal of a browse request is input into the PDA 200 from the user, the PDA 200 (the content display processing unit 204) displays the customer information on a display unit, the customer information corresponding to the customer record included in the transmission file decrypted into the plain text (S6). Thus, the user is able to browse the customer information on the display unit of the PDA 200.

All the above-mentioned processes on the PDA 200 (S5 and S6) employ the tamper-resistant capabilities, and the viewer 210 performs the processes holding the file within the tamper-resistant capabilities. The user is not able to know the common key or the device-specific information. However, once the electronic ticket is acquired with the PDA 200, it is possible to browse the customer information of the encrypted file with the capabilities of the viewer 210 even in a mobile environment, from which the PDA 200 cannot access the content management server 110.

With the above-mentioned system, the key length of the public key is reasonably determined. The key length of the public key is determined when encrypting the customer information, based on the value T of the customer information corresponding to the amount of customer information (the number of the customer records) that can be browsed on the PDA 200. For example, in the case where the value of each customer record (value information) V is set to 15,000 yen (V=15,000 yen), the number of the customer records M that can be browsed on the PDA 200 is set to 100 (M=100), and the protection period of the customer information Y is set to 20 years, the computational power F for a unit price 1 yen is set to $1.55 \times 10^{12}$ bits, an optimum key length of the calculation result is 643 bits according to the expressions (1) through (4). The value of F is calculated assuming that the total sales price of a 1 GHz CPU and a mother board is, for example, 30,000 yen (Refer to Simson Garfinkle, "PGP: Pretty Good Privacy", O'Reilly, 1994.). The computational power F for the unit price 1 yen are determined based on the cost and the performance of the processing unit (composed of a CPU and a motherboard) that can decrypt or decode the encrypted information or data maliciously or without authorization.

The key length of 643 bits of the public key used for encrypting the file to be delivered to the PDA 200 is 0.314 times the key length 2048 bits used for encrypting the customer information at the highest level of encryption strength on the content management server 110. If it is assumed that a decryption period of the RSA encryption is proportional to the third power of the key length, the decryption process of the encrypted file will be speeded up by 32 times. Therefore, even if a low-performance PDA 200 is used (the processing speed is slow), it is possible to decrypt at a practical speed and browse the file protected sophisticatedly by the above-mentioned public key having the reasonable key length.

In addition, when the customer information is displayed on another type of PDA 200 that displays with the capabilities of the viewer 210, the decryption process is performed on every page every time the page is changed. The PDA 200 displays every page on the viewer 210 on a page basis, instead of displaying all the customer information at a time retained under the environment of the tamper-resistance capabilities. In this case, the decryption process is performed frequently, and it becomes more effective because the decryption can be performed at a practical speed even if the performance is low as described above.

Further, the customer information used on the PDA 200 is protected by the electronic ticket generated by the device-specific information of the PDA 200 and the public key, and it becomes harder to decrypt the customer information on another device. It is thus possible to protect the customer information robustly. Also, the processes related to the decryption are performed on the PDA 200 and various pieces of information are retained under the tamper-resistant environment. It is thus possible to maintain the enhanced security of the customer information.

In an example mentioned above, the RSA encryption is employed for protecting the information (the customer information), however, another public key encryption system such as ElGamal encryption, elliptic curve cryptosystem, NTRU, and the like may be employed. When the user sets up the number of the records of the file that the user can browse, an estimated period required for decrypting or decoding the encrypted information or data maliciously or without authorization on a virtual device such as PC is displayed as reference information so that the user can adjust the scope of the available information.

The value T of the encrypted information is calculated according to the expression (1); however, another arithmetic expression may be employed. For instance, an estimate value B is set to a corrective value. The estimate value B is the lost in the brand image together with the loss of confidence caused resulting from the leakage of the customer information. The value T of the customer information, which is an estimate price of the file, is calculated with $$T = V \cdot M + B \tag{5}$$

The estimate formula C(n) used for calculating the optimum key length K in the expression (3) is not limited to the definitions in the expression (4). For instance, the following estimate formula may be employed.

$$C(n) = \text{Exp}(1.92 + o(1)) \cdot ((\log n)^{(1/3)}) \cdot ((\log \log n)^{(2/3)}) \tag{6}$$

The estimate formula C(n) in the expression (6) is an expression for estimating the calculation amount of a number field sieve method, which is the best method of attacking the encryption system dependent on the difficulties of the factorization into prime factors of RSA or the like (Refer to J. P. Buhler, H. W. Lenstra, Jr., Carl Pomerance, Factoring integers with the number field sieve, Springer-Verlag, pp. 50-94, 1993). In the expression (6), the estimate formula C(n) is set, C(n)=v log v, however, C(n)=log v may be employed.

An equation of Hilde brand-Tenenbaum or an approximate expression thereof may be employed in the estimate calculation of $\Psi(x,y)$ required for determining the appropriate encryption strength of the information (Refer to Transactions of the American Mathematical Society, Vol. 296, Number 1, pp. 265-290, 1986, Theorem 1).

In the above-mentioned system, the public key having the key length, which is determined based on the value of the encrypted information, is used for the encryption of the common key. However, the common key may be used for the encryption of the information directly. The strength parameter representing the encryption strength is not limited to the key length used for the encryption of the information, and may be set arbitrarily based on the encryption method (algorithm).

With the above-mentioned system, the customer information that can be divided into customers is encrypted; however, another system that encrypts other kinds of information may be employed.

For example, in a system with which management information is released quarterly is encrypted, in the case where the management information is encrypted with the highest level of the encryption strength of 2048-bit public key and the encrypted management information is decrypted on a desktop PC of 3.2 GHz, 2.68 seconds of process period is required for every action. In the case where the encrypted management information is decrypted on a PDA of 300 MHz, 28.6 seconds of process period is required for every action. One of the values of the management information can be estimated based on, for example, an unfair profit caused resulting from an insider trading because of the leakage of the management information that happened in the past. In the case where thus estimate value of the management information is, for example, 6,700,000,000 yen, which is less than 10,000,000,000 yen, the key length of the public key is 650 bits. The key length is determined according to the expressions (2) through (4), with the value information and the protection period, a quarter of a year. In the case where the management information encrypted with 650-bit public key is decrypted on the desktop PC of 3.2 GHz, 0.08 second of the process period is required for every action. In the case where the encrypted management information is decrypted on the PDA of 300 MHz, 0.91 second of the process period is required for every action. In this manner, the process speed can be accelerated on both the desktop PC and the PDA by nearly 30 times.

In the above-mentioned description, a first unit corresponds to the capabilities realized in the information input processing unit 111 and the content value calculation processing unit 114. The key length determination processing unit 115 corresponds to a second unit, more specifically, a third unit. The calculation capabilities according to the expression (1) or (5) in the content value calculation processing unit 114 correspond to a fourth unit. A fifth unit corresponds to the calculation process according to the expression (2) in the key length determination processing unit 115. The calculation process according to the expression (3) in the key length determination processing unit 115 corresponds to a sixth unit calculating the key length satisfying the condition, based on the estimate calculation amount corresponding to the unit price, a value denoted by the value information, and an estimate formula for calculating an estimate calculation amount necessary for decrypting or decoding the encrypted information or data maliciously or without authorization.

As described above, the encryption device, the encryption method and program, and information protection system employing the encryption device in accordance with the present invention are capable of determining the encryption strength when the information is encrypted. The encryption device, the encryption method and program, and information protection system employing the encryption device is effective when the encryption strength is determined for encrypting the information.

On the encryption device in the above-mentioned aspect, the second unit has a third unit that calculates a key length used for encrypting the information as the strength parameter.

On the encryption device in the above-mentioned aspect, the information to be encrypted is a file having at least one data unit, and the first unit has a fourth unit that calculates an estimate price of the file, based on an estimate unit price of the data unit included in the file and the number of the data units included in the file, to acquire the estimate price of the file to be encrypted as the value information.

On the encryption device in the above-mentioned aspect, the third unit calculates the key length used for encrypting the information, the key length satisfying a condition that an estimate cost necessary for decrypting or decoding the encrypted information or data maliciously or without authorization is equal to or more than a value denoted by the value information.

On the encryption device in the above-mentioned aspect, the fourth unit acquires another price as the value information, said another price being the estimate price of the file added by a corrective price.

On the encryption device in the above-mentioned aspect, the third unit calculates a minimum value of the key length satisfying the condition to be used for encrypting the information.

On the encryption device in the above-mentioned aspect, the third unit has a fifth unit and a sixth unit, the fifth unit calculating an estimate calculation amount corresponding to a unit price, which is an estimate value of a calculation amount in a unit price and in a period, based on the computational power of the unit price varying dependent on a price and the performance of a processing device that decrypts or decodes the encrypted information or data maliciously or without authorization, the sixth unit calculating the key length satisfying the condition, based on the estimate calculation amount corresponding to the unit price, a value of the value information, and an estimate formula for calculating an estimate calculation amount necessary for decrypting or decoding the encrypted information or data maliciously or without authorization.

On the encryption device in the above-mentioned aspect, the period used for calculating the estimate calculation amount corresponding to the unit price is set as a protection period of the encrypted information.

With the above-mentioned configuration, it is possible to calculate with the longer key length as the strength parameter as the protection period of the encrypted information becomes longer.

On the encryption device in the above-mentioned aspect, the estimate calculation amount corresponding to the unit price is calculated according to a method based on Moore's Law.

On the encryption device in the above-mentioned aspect, the estimate calculation amount corresponding to the unit price f(Y), which is given with a following expression, where F denotes the calculation amount capabilities and Y denotes the period.

$$f(Y)=F\cdot(2^{(Y/1.5)})$$

On the encryption device in the above-mentioned aspect, the calculation amount C(n) is necessary for factorization into prime factors, in the case where n denotes an integer number factorized into prime factors as the estimate arithmetic expression, C(n) being given with a following expression, where $\Psi(x,y)$ denotes a positive integer of x or less, and a number of pieces of the prime factor of x does not exceed y, and d denotes a positive odd number.

$$C(n)=v \log v, v=\min\{w|\Psi(x,y)>=xy/\log y, x=2d(n^{(2/d)})(w^{((d+1)/2)},y>0)\}$$

On the encryption device in the above-mentioned aspect, the estimate calculation amount corresponding to the unit price f(Y), which is given with a following expression, where F denotes the calculation amount capabilities and Y denotes the period; and $$f(Y)=F\cdot(2^{(Y/1.5)})$$

the key length K is calculated according to a following expression, where T denotes the value information and lg denotes a logarithm having a base of 2.

$$K=\lg\{\min\{n|C(n)>T\cdot f(Y)\}\}$$

On the encryption method in the above-mentioned aspect, further including calculating a key length used for encrypting the information as the strength parameter.

On the encryption method in the above-mentioned aspect, calculating the key length calculates, as the key length for encrypting the information, the key length satisfying a condition that an estimate cost necessary for decrypting or decoding the encrypted information or data maliciously or without authorization is equal to or more than a value denoted by the value information.

On the encryption method in the above-mentioned aspect, calculating the key length calculates a minimum value of the key length satisfying the condition to be used for encrypting the information.

On the encryption method in the above-mentioned aspect, calculating the key length includes calculating an estimate calculation amount corresponding to a unit price, which is an estimate value of a calculation amount in a unit price and in a period, based on a computational power of the unit price varying dependent on a price and a performance of a processing device that decrypts or decodes the encrypted information or data maliciously or without authorization, and calculating the key length satisfying the condition, based on the estimate calculation amount corresponding to the unit price, a value of the value information, and an estimate formula for calculating an estimate calculation amount necessary for decrypting or decoding the encrypted information or data maliciously or without authorization.

On the encryption method in the above-mentioned aspect, the period used for calculating the estimate calculation amount corresponding to the unit price is set as a protection period of the encrypted information.

On the storage medium readable by a computer to perform a program for encryption in the above-mentioned aspect, the program including acquiring value information denoting a value of information to be encrypted, and calculating a strength parameter denoting an encryption strength when the information is encrypted, based on the value information.

On the storage medium readable by a computer to perform a program for encryption in the above-mentioned aspect, further including calculating a key length used for encrypting the information as the strength parameter.

On the storage medium readable by a computer to perform a program for encryption in the above-mentioned aspect, calculating the key length calculates, as the key length for encrypting the information, the key length satisfying a condition that an estimate cost necessary for decrypting or decoding the encrypted information or data maliciously or without authorization is equal to or more than a value denoted by the value information On the storage medium readable by a computer to perform a program for encryption in the above-mentioned aspect, calculating the key length calculates a minimum value of the key length satisfying the condition to be used for encrypting the information.

On the storage medium readable by a computer to perform a program for encryption in the above-mentioned aspect, calculating the key length includes calculating an estimate calculation amount corresponding to a unit price, which is an estimate value of a calculation amount in a unit price and in a period, based on a computational power of the unit price varying dependent on a price and a performance of a processing device that decrypts or decodes the encrypted information or data maliciously or without authorization, and calculating the key length satisfying the condition, based on the estimate calculation amount corresponding to the unit price, a value of the value information, and an estimate formula for calculating an estimate calculation amount necessary for decrypting or decoding the encrypted information or data maliciously or without authorization.

On the storage medium readable by a computer to perform a program for encryption in the above-mentioned aspect, the period used for calculating the estimate calculation amount corresponding to the unit price is set as a protection period of the encrypted information.

On the information protection system in the above-mentioned aspect, the content encryption processing unit encrypts the information with device-specific information on which encrypted information is used and a key length determined as the strength parameter denoting the encryption strength by the encryption device.

The above-mentioned algorithm is not limited in particular. The strength parameter is not limited, if the strength parameter denotes the encryption strength in the algorithm used for the encryption of the information.

Although a few preferred embodiments of the present invention have been shown and described, it would be appreciated by those skilled in the art that changes may be made in these embodiments without departing from the principles and spirit of the invention, the scope of which is defined in the claims and their equivalents.

The entire disclosure of Japanese Patent Application No. 2004-278540 filed on Sep. 24, 2004 including specification, claims, drawings, and abstract is incorporated herein by reference in its entirety.

What is claimed is:

1. An encryption device that receives a request for information, the encryption device comprising:

a processing unit;

a first unit that acquires, in response to receiving the request, value information denoting a value of the information to be encrypted, wherein the first unit acquires the value information using the processing unit; and a second unit that determines a strength parameter denoting an encryption strength for the information, based on the value information, wherein the second unit has a fifth unit and a sixth unit, the fifth unit calculating an estimate calculation amount corresponding to a unit price, wherein the estimated calculation amount is an estimate value of a calculation amount in the unit price and in a period, based on a computational power in the unit price varying dependent on a price and a performance of a processing device that decrypts or decodes encrypted information maliciously or without authorization, and the sixth unit calculating the strength parameter satisfying a condition, based on the estimate calculation amount corresponding to the unit price, a value of the value information, and an estimate formula for calculating an amount necessary for decrypting or decoding the encrypted information maliciously or without authorization, wherein the estimate calculation amount corresponding to the unit price is $f(Y)$, which is given by a following expression, $$f(Y)=F \cdot (2^{\wedge}(Y/1.5)),$$

where F denotes the computational power in the unit price and Y denotes the period.

2. The encryption device as claimed in claim 1, wherein the second unit comprises a third unit that calculates a key length used for encrypting the information as the strength parameter.

3. The encryption device as claimed in claim 2, wherein the third unit calculates the key length such that the key length satisfies a condition that a cost necessary for decrypting or decoding encrypted information or data maliciously or without authorization is equal to or more than an estimate price of the information to be encrypted.

4. The encryption device as claimed in claim 3, wherein the third unit calculates a minimum value of the key length satisfying the condition to be used for encrypting the information.

5. The encryption device as claimed in claim 3, wherein the period used for calculating the estimate calculation amount corresponding to the unit price is a protection period of the encrypted information.

6. The encryption device as claimed in claim 3, wherein the estimate calculation amount corresponding to the unit price is calculated according to a method based on Moore's Law.

7. The encryption device as claimed in claim 1, wherein:
the information to be encrypted is a file having at least one data unit; and
the first unit has a fourth unit that calculates an estimate price of the file, based on an estimate price of the data unit and a number of data units included in the file, and sets the value information to the estimate price of the file.

8. The encryption device as claimed in claim 7, wherein the fourth unit acquires another price as the value information, said another price being the estimate price of the file added to a corrective price.

9. The encryption device of claim 1, wherein the second unit dynamically adjusts the strength parameter in response to a change to the value of the information to be encrypted.

10. The encryption device of claim 1, further comprising:
an encrypting unit which encrypts the requested information based on the determined strength parameter.

11. An encryption method, performed by a processing unit, which encrypts information requested for in a received request, the encryption method comprising:
acquiring, using the processing unit, value information denoting a value of the information to be encrypted, wherein the value information is acquired in response to the received request; and
determining a strength parameter denoting an encryption strength for the information, based on the value information, wherein the determining the strength parameter comprises:
calculating an estimate calculation amount corresponding to a unit price, wherein the estimate calculation amount is an estimate value of a calculation amount in the unit price and in a period, based on a computational power in the unit price varying dependent on a price and a performance of a processing device that decrypts or decodes the encrypted information or data maliciously or without authorization; and
calculating the strength parameter satisfying a condition, based on the estimate calculation amount corresponding to the unit price, a value of the value information, and an estimate formula for calculating an amount necessary for decrypting or decoding the encrypted information or data maliciously or without authorization,
wherein the estimate calculation amount corresponding to the unit price is f(Y), which is given by a following expression, $$f(Y)=F \cdot (2^{(Y/1.5)}),$$

where F denotes the computational power in the unit price and Y denotes the period.

12. The encryption method as claimed in claim 11, further comprising calculating a key length used for encrypting the information as the strength parameter.

13. The encryption method as claimed in claim 12, wherein a process of calculating the key length calculates the key length such that the key length satisfies a condition that an estimate cost necessary for decrypting or decoding encrypted information or data maliciously or without authorization is equal to or more than an estimate price of the value information.

14. The encryption method as claimed in claim 13, wherein the process of calculating the key length calculates a minimum value of the key length satisfying the condition to be used for encrypting the information.

15. The encryption method as claimed in claim 13, wherein the period used for calculating the estimate calculation amount corresponding to the unit price is a protection period of the encrypted information.

16. The encryption method of claim 11, further comprising:
dynamically adjusting the strength parameter in response to a change to the value of the information to be encrypted.

17. The encryption method of claim 11, further comprising:
encrypting the requested information based on the determined strength parameter.

18. A non-transitory computer readable storage medium storing a program that when executed by a processing unit implements functions of an encryption method that encrypts information requested for in a received request, the functions comprising:
acquiring, in response to the received request, value information denoting a value of the information to be encrypted; and
determining a strength parameter denoting an encryption strength for the information, based on the value information, wherein the determining the strength parameter comprises:
calculating an estimate calculation amount corresponding to a unit price, wherein the estimate calculation amount is an estimate value of a calculation amount in the unit price and in a period, based on a computational power in the unit price varying dependent on a price and a performance of a processing device that decrypts or decodes the encrypted information or data maliciously or without authorization; and
calculating the strength parameter satisfying a condition, based on the estimate calculation amount corresponding to the unit price, a value of the value information, and an estimate formula for calculating an amount necessary for decrypting or decoding the encrypted information or data maliciously or without authorization,
wherein the estimate calculation amount corresponding to the unit price is f(Y), which is given by a following expression, $$f(Y)=F \cdot (2^{(Y/1.5)}),$$

where F denotes the computational power in the unit price and Y denotes the period.

19. The non-transitory computer readable storage medium as claimed in claim 18, further comprising calculating a key length used for encrypting the information as the strength parameter.

20. The non-transitory computer readable storage medium as claimed in claim 19, wherein a process of calculating the key length calculates the key length such that the key length satisfies a condition that an estimate cost necessary for decrypting or decoding encrypted information or data maliciously or without authorization is equal to or more than an estimate price of the value information.

21. The non-transitory computer readable storage medium as claimed in claim 20, wherein the process of calculating the key length calculates a minimum value of the key length satisfying the condition to be used for encrypting the information.

22. The non-transitory computer readable storage medium as claimed in claim 20, wherein the period used for calculating the estimate calculation amount corresponding to the unit price is a protection period of the encrypted information.

23. The non-transitory computer readable storage medium of claim 18, wherein the functions further comprise:
dynamically adjusting the strength parameter in response to a change to the value of the information to be encrypted.

24. The non-transitory computer readable storage medium of claim 18, wherein the functions further comprise:
encrypting the requested information based on the determined strength parameter.

25. An information protection system comprising:
an encryption device that receives a request for information; and
a content encryption processing unit that encrypts the information with an encryption strength denoted by a strength parameter obtained by the encryption device,
wherein the encryption device includes a first unit that acquires, in response to receiving the request, value information denoting a value of the information to be encrypted and a second unit that calculates the strength parameter denoting the encryption strength, based on the value information,
wherein the second unit has a fifth unit and a sixth unit, the fifth unit calculating an estimate calculation amount corresponding to a unit price, wherein the estimate calculation amount is an estimate value of a calculation amount in the unit price and in a period, based on a computational power in the unit price varying dependent on a price and a performance of a processing device that decrypts or decodes encrypted information maliciously or without authorization, and the sixth unit calculating the strength parameter satisfying a condition, based on the estimate calculation amount corresponding to the unit price, a value of the value information, and an estimate formula for calculating an amount necessary for decrypting or decoding the encrypted information maliciously or without authorization,
wherein the estimate calculation amount corresponding to the unit price is f(Y), which is given by a following expression, $$f(Y)=F\cdot(2^{\wedge}(Y/1.5)),$$

where F denotes the computational power in the unit price and Y denotes the period.

26. The information protection system as claimed in claim 25, wherein the content encryption processing unit encrypts the information with device-specific information on which encrypted information is used and with a key length determined as the strength parameter denoting the encryption strength by the encryption device.

27. The information protection system claim 25, wherein the second unit dynamically adjusts the strength parameter in response to a change to the value of the information to be encrypted.

* * * * *